United States Patent
Hanson et al.

(10) Patent No.: US 10,878,603 B1
(45) Date of Patent: Dec. 29, 2020

(54) FAN OUT VISUALIZATION FOR DATA COPIES

(71) Applicant: EMC IP Holding Company LLC, Hopkinton, MA (US)

(72) Inventors: Skip Hanson, Aptos, CA (US); Jase Smith, Thornton, CO (US); Peter Imming, Raleigh, NC (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 181 days.

(21) Appl. No.: 15/283,599

(22) Filed: Oct. 3, 2016

(51) Int. Cl.
- *G06F 3/048* (2013.01)
- *G06T 11/20* (2006.01)
- *G06F 3/0484* (2013.01)

(52) U.S. Cl.
CPC .......... *G06T 11/206* (2013.01); *G06F 3/0484* (2013.01)

(58) Field of Classification Search
CPC ...... G06F 3/048; G06F 3/0484; G06F 3/0482; G06F 3/04817; G06F 11/1448; G06F 11/1458; G06F 11/206; G06F 11/448

See application file for complete search history.

(56) References Cited

U.S. PATENT DOCUMENTS

| 8,943,441 B1* | 1/2015 | Patrick .................. G06F 3/0484 715/853 |
| 2008/0034011 A1* | 2/2008 | Cisler ............... G06F 17/30053 |
| 2010/0306364 A1* | 12/2010 | Terry ..................... H04L 12/66 709/224 |
| 2015/0199367 A1* | 7/2015 | Hammer .......... G06F 17/30085 707/654 |

OTHER PUBLICATIONS

O'Brien, Bill, "10 drive docks help you reuse old hard drives", Jun. 22, 2011, Computerworld, retreived from https://www.computerworld.com/article/2508817/data-center/10-drive-docks-help-you-re-use-old-hard-drives.html (Year: 2011).*

* cited by examiner

*Primary Examiner* — Haoshian Shih
(74) *Attorney, Agent, or Firm* — Dergosits & Noah LLP; Todd A. Noah (57) ABSTRACT

A system and method for providing a graphical representation of copies of a data object stored across a plurality of storage arrays are provided. A primary data object stored in a first file store and one or more secondary data objects stored on one or more secondary file stores are identified. The one or more secondary data objects represent one or more copies of the primary data object. A graphic representing the primary data object and its relationship to the one or more secondary data objects is provided for display on a user interface.

17 Claims, 6 Drawing Sheets

FAN OUT VISUALIZATION FOR DATA COPIES

BACKGROUND

The present invention relates to the field of information technology, including, more particularly, to systems and techniques for data storage and recovery.

Backup applications executing backup operations enable restoration of databases via copies of a desired database state that is saved in dedicated backup files. Such applications provide solutions for instances where software errors corrupt a database, or when erroneous data is used to update databases. In such instances, a database administrator may restore the database to a previous uncorrupted state that does not include the corrupted or erroneous data. When the database administrator decides to return the database to a previous state, the database administrator may specify the desired previous state by identifying a desired point in time when the database was in this state, and instructs the backup application to execute a restore operation to restore a previous state of the database using a copy of the backup files that corresponds to the previous state. In some backup applications, multiple copies of backup files may be stored across a variety of platforms to provide redundancy and ease of access.

Backup applications may store snapshots representing a database on a storage array, which is a disk storage system that contains multiple disk drives. A snapshot, and in particular a point-in-time snapshot, is a capture of the state of a computer system object, such as a database, at a specific moment in time. An enterprise may have a backup administrator to manage a backup application to create snapshots of computer system objects, use multiple storage arrays to store snapshots of computer system objects, and have multiple storage administrators managing the multiple storage arrays.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

An administrator of an enterprise's computer system may need information regarding snapshots that are stored on the enterprise's storage arrays to help meet service level objectives. However, the usability and intuitiveness of snapshot technologies is still a challenge for end users due to the robustness and complexity of enterprise backup systems. For example, multiple copies of the same snapshot may be stored across several storage arrays, both locally and remotely, but there is no easy manner in which an administrator may view all the copies of a particular snapshot. Further to this example, a backup administrator may not be able to discover array-based information about snapshots corresponding to the specific source that are stored on specific storage arrays of the enterprise because the backup application may provide only a very abstracted view of the storage subsystem used to store snapshots.

Embodiments herein provide a manner which the multiple copies of a snapshot across a variety of storage arrays may be easily viewed. A system may identify a primary data object stored in a first file store and identify one or more secondary data objects stored on one or more secondary file stores, where the one or more secondary data objects representing one or more copies of the primary data object. The system may then provide for display on a user interface a graphic representing the primary data object and its relationship to the one or more secondary data objects. The graphic representing the primary and second data objects (i.e., snapshots) may be depicted as a fan out visualization so that an administrator may easily ascertain the relationship between the multiple data objects.

Figure 1:
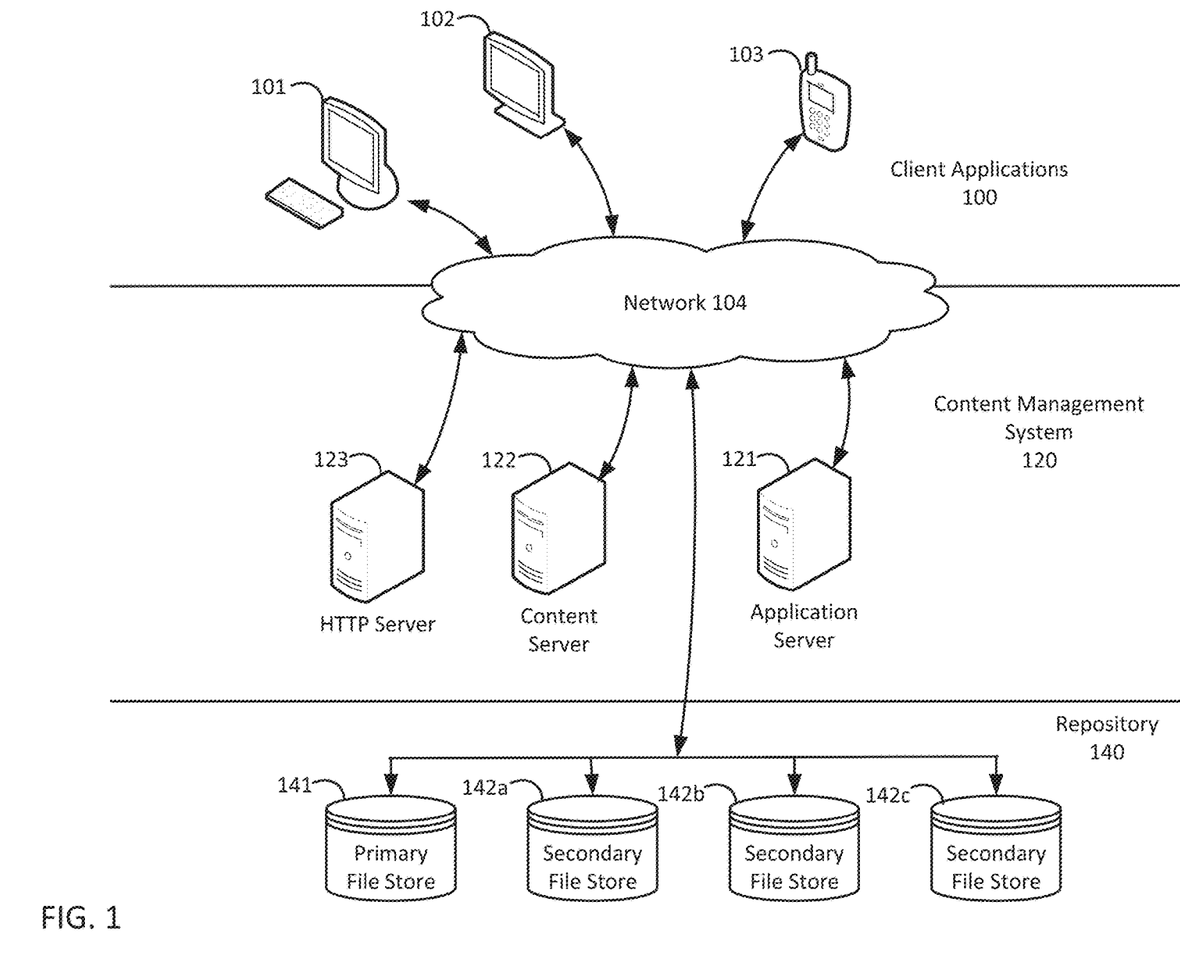
FIG. 1 illustrates a block diagram of an example hardware device in which the subject matter may be implemented.

Prior to describing the subject matter in detail, an exemplary hardware system in which the subject matter may be implemented is described. Those of ordinary skill in the art will appreciate that the elements illustrated in FIG. 1 may vary depending on the system implementation. FIG. 1 illustrates one embodiment of a system for providing an enterprise-level managed content service. Client applications 100 access a content management system 120, which operates and manages a repository system 140.

The use of the client applications 100 originates from client devices, such as client devices 101, 102, 103, which communicate through a network 104 with an application server 121 in order to use one or more applications hosted in part or entirely on the application server 121. In one embodiment, the network 104 is an Ethernet connection using conventional TCP/IP communication methods with both client devices and server devices. However, other types of network connection technologies are well known and may also be used to full advantage, including local area network (LAN), wide area network (WAN), storage area network (SAN), the Internet, etc. Each of the client devices 101-103 may be any type of processor-based digital device, such as desktop, laptop computer, tablet, smartphone, or other smart hand-held device.

The application server 121 hosts one or more applications running on a content management platform that provide access to the repository 140 for clients hosted on a content server 122, which is also accessible to the client devices 101-103 via the network 104. An HTTP server 123 is also coupled to the network 104 to provide an administrative terminal for system operators to perform system maintenance, logging, access control, backup and recovery operations, etc. The client devices 101-103 and the servers 121-123 may each be substantially similar to the system 500 depicted in FIG. 5 and described below.

The repository 140 is provided for use by the client applications 100, through the content server 122, which is accessible to the client devices 101-103 through the network 104. The repository 140 may include a primary file store 141 for storing content items, and one or more secondary file stores 142a-142c for providing additional space for storing original data objects or backup copies of the data objects. In some embodiments, one or more of the secondary file stores 142a-142c can be a cloud storage device.

The primary file store 141 and the one or more secondary file store 142a-142c may include any combination of a flash memory data storage device, a hard disk drive, a magnetic disk drive, and an optical disk drive. The drives and their associated computer-readable media provide nonvolatile storage of computer readable instructions, data structures, program modules and other data for the hardware device 100.

A software platform runs on each of the various components, such as the Documentum® Platform software and related Enterprise Content Management software, provided by EMC® Corporation, Hopkington, Mass. The Documentum® Platform provides capabilities for managing enterprise content and is the foundation for related content management and case management product offering.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that the various acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the content management system 120 includes one or more methods for providing a fan out visualization of data copies stored in the repository 140.

In the prior art, an administrator of an enterprise's computer system may not be able to easily ascertain the number of copies of a data object that exists, nor how they are propagated across the different file stores on the repository 140. Embodiments herein enable the generation and provision of a graphical visualization of the data objects, including original and duplicate copies, stored across different file stores on the repository 140. The content server may create and provide for display to the administrator a view of the data objects and respective copies of the data objects in a graphical representation. The graphical representation may provide a concise, flexible and intuitive view of all the data objects including copies regardless of the file store on which the data objects and copies are stored.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

Figure 2:
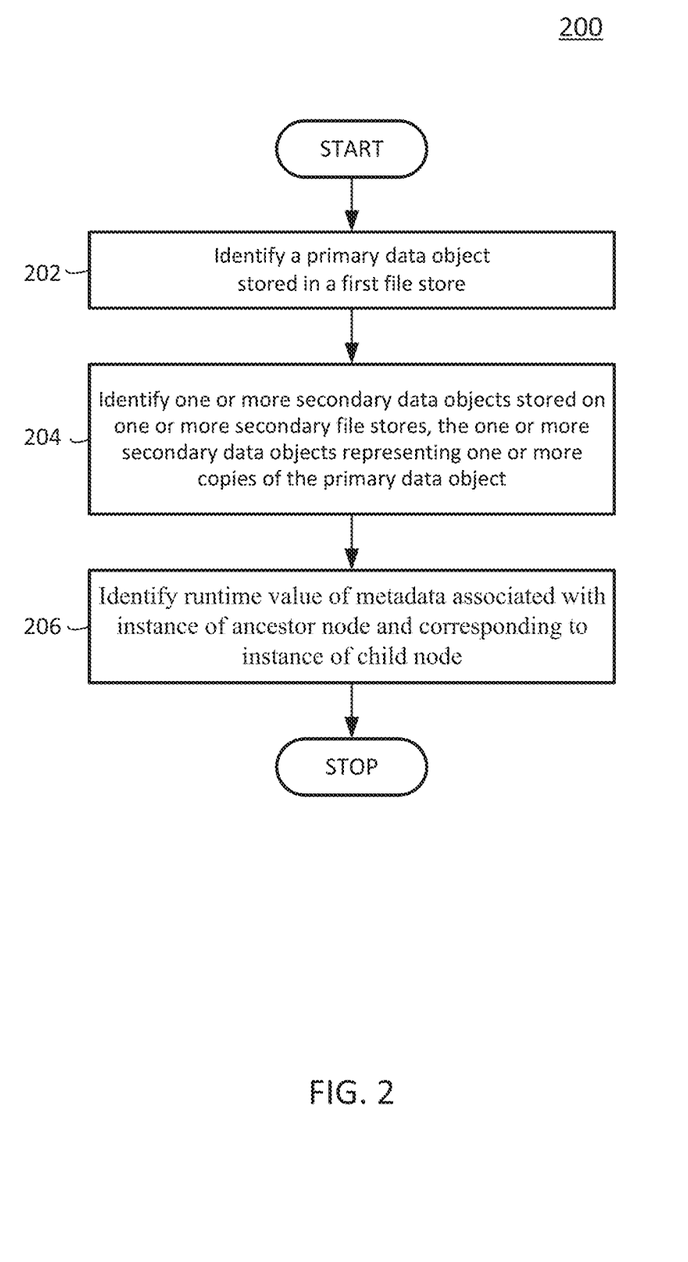
FIG. 2 is an example flow chart illustrating a process for providing a fan out visualization of data copies stored across different file stores.

FIG. 2 is an example flow chart illustrating a process for providing a fan out visualization of data copies stored across different file stores. Flowchart 200 illustrates method acts as flowchart blocks for certain steps involved in and/or between the content management system 120 and the client applications 100, and content management system 120 and the repository 140 of FIG. 1.

A primary data object stored in a primary file store 141 is identified in act 202. For example, the content server 122 executes an application program to discover the primary data object in the primary file store 141 of repository 140. The primary data object may be a primary snapshot, which is a capture of the state of a computer system object, such as a database, at a specific moment in time. The primary file store 141, for the purpose of this example, is a storage array such as a VMAX storage array. VMAX storage arrays are highly reliable and scalable storage platforms that are used in open systems and mainframe computing.

One or more secondary data objects stored on one or more secondary file stores are identified in act 204. The one or more secondary data objects represent one or more copies of the primary data object. For example, copies may be made of the primary data object and subsequently stored on secondary file stores. Individual copies may be stored on each of the secondary file stores to provide redundancy. In a fashion similar to that of act 202, the content server 122 executes an application program to discover the copies of the data object in the on one or more secondary file stores 142a-142c of repository 140. The one or more copies of the data object may be secondary snapshots also representing captures of the state of a computer system object, such as a database, at a specific moment in time.

The secondary file stores 142a-142c, for the purpose of this example, may include a storage array such as XtremIO, which provides flash-based scale-out enterprise storage array, or Data Domain, which offers deduplication solutions for disk based backup. The secondary file stores 142a-142c may also include any of a variety of forms of cloud storage.

Typically, more cost efficient types of file stores are used as secondary file stores to provide back up to data primarily stored on more expensive and more reliable primary file stores. While the example provided here suggests that the primary data object is stored in the primary file store 141 and that the copies of the primary data object are stored on the secondary file stores 142a-142c, in some embodiments, the primary data object may be stored in one of the secondary file stores 142a-142c, while copies of the primary data object may be stored on the primary as well as the secondary file stores 141 and 142a-142c.

Figure 3:
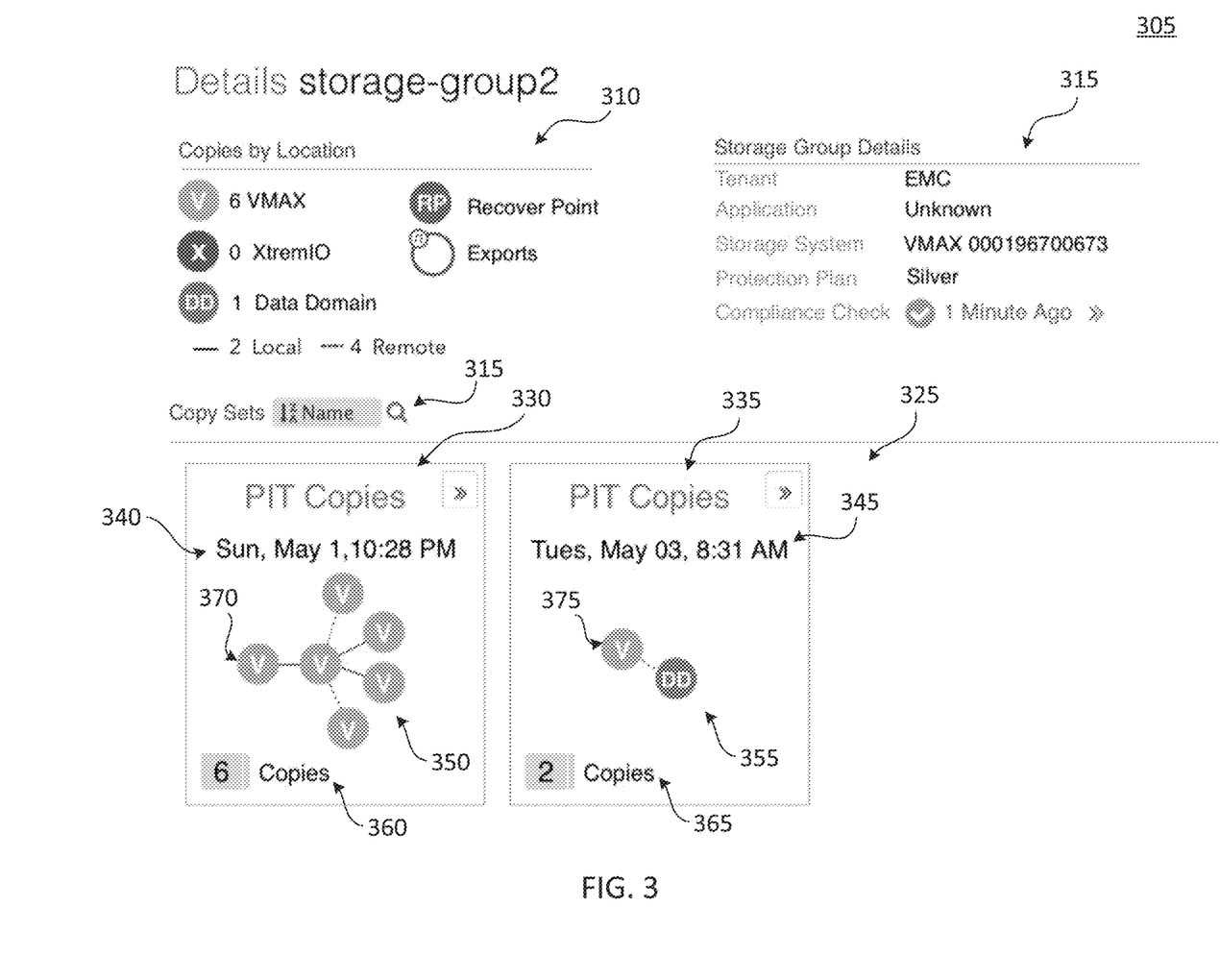
FIG. 3 depicts an example fan out graphic depicting two point-in-time data objects and associated copies, under an embodiment.
Figure 4A:
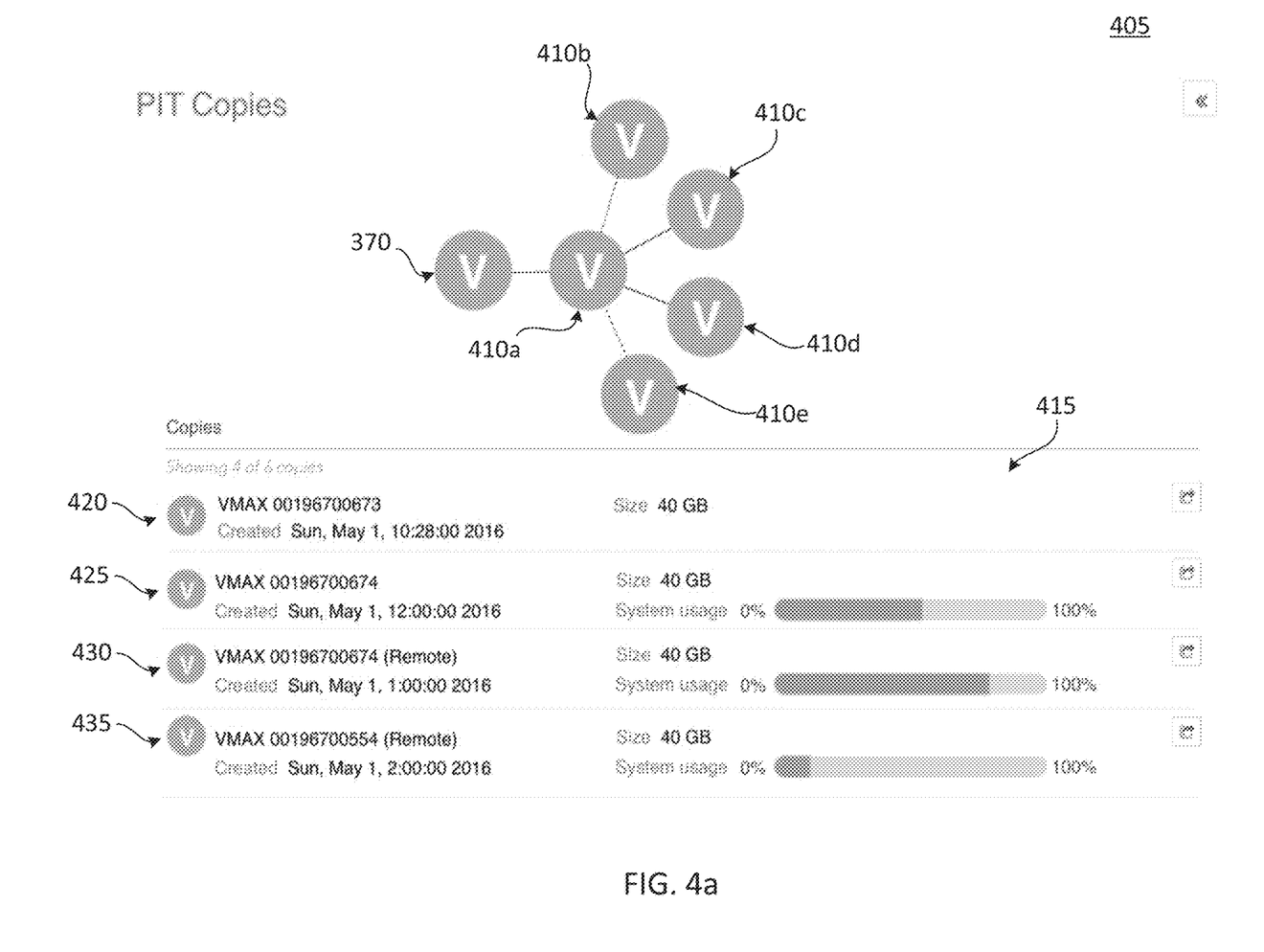
FIGS. 4a and 4b depict examples of drill in views of point-in-time data objects, under an embodiment.
Figure 4B:
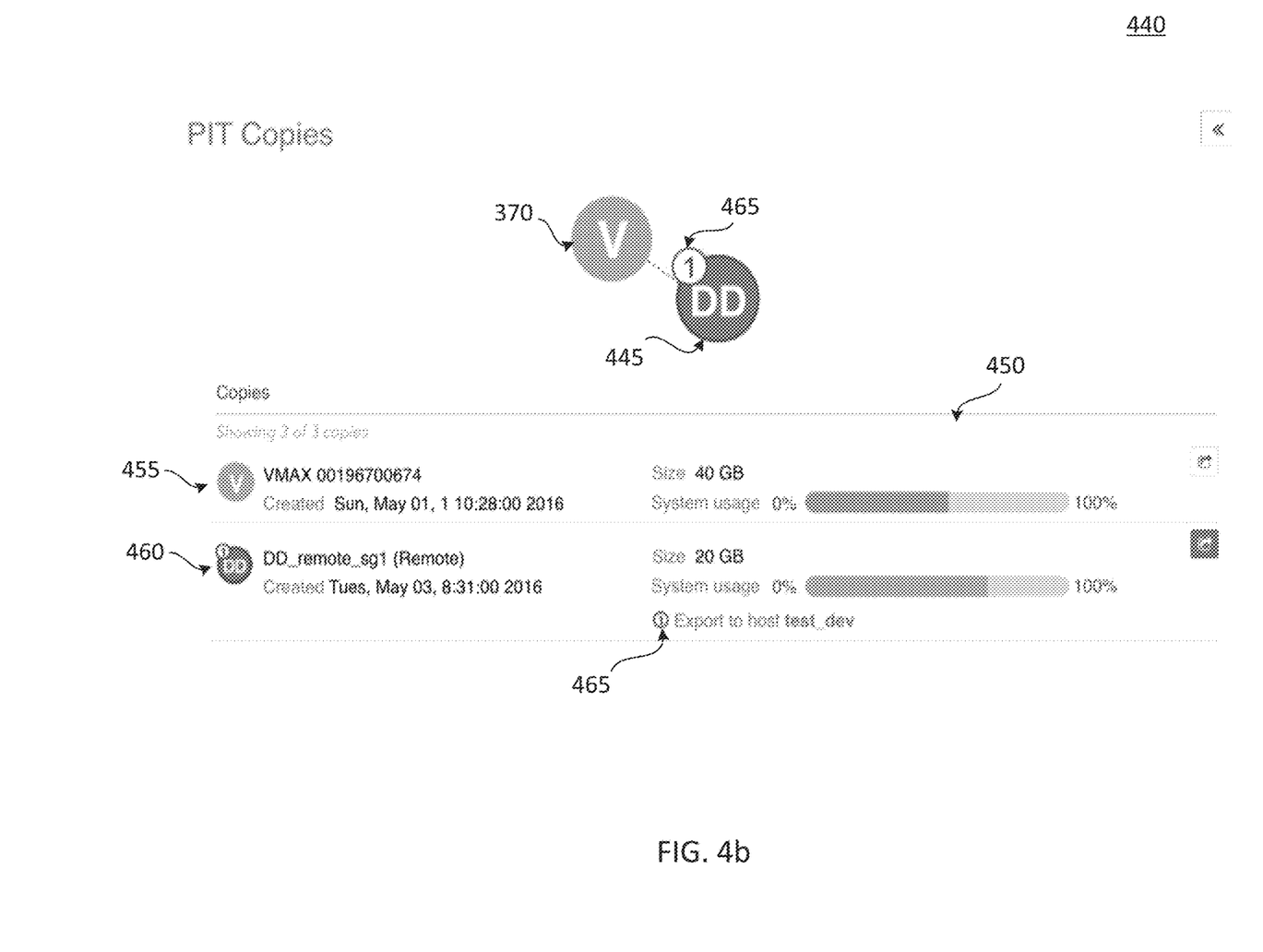

Once the primary data object and the one or more secondary data objects have been identified, a graphic representing the primary data object and its relationship to the one or more secondary data objects is provided for display on a user interface. The graphic, which will be described in further details below with respect FIGS. 3, 4a and 4b, provides a concise, flexible and intuitive view of the primary data object along with all the secondary data objects regardless of the physical file store at which the data objects are stored. For example, if a primary data object stored in the primary file store has four associated copies stored as secondary data objects across four different secondary file stores, the graphic will provide a representation of all five data objects and an indication of their relationship to one another. In some embodiments, the graphic will also provide an indication of the location of each of the data objects.

FIG. 3 provides an example fan out graphic depicting two point-in-time data objects and associated copies. The fan out graphic 300 relates to "storage-group2," as indicated in header 305. A legend 310 may provide certain details for storage-group2. In the example shown, the legend 310 provides an explanation of the symbols on the fan out graphic 300, as well as a summary of the location of each copy. For example, the legend 310 shows that a VMAX storage array is represented by a circle with the letter "V" inscribed, an XtremIO storage array is represented by a circle with the letter "X" inscribed, a Data Domain storage array is represented by a circle with the letter "X" inscribed, and a Recovery Point is represented by a circle with the letters "RP" inscribed. The legend 310 further shows that exports are represented by a number enclosed in a small circle on the perimeter of the circle representing one of the storage arrays, where the enclosed number indicates the number of times the data object has been exported. The legend 310 also shows two different types of connectors between the data objects, which are used to distinguish copies that are stored locally from copies that are stored remotely. In this example, copies that are stored locally are represented by solid lines in the fan out visualization. Copies that are stored remotely, on the other hand, are represented by dashed lines.

In addition to providing explanations of the symbols on the fan out graphic 300, the legend 310 may also provide a summary related to storage-group2. For example, the legend 310 provides an indication of the number of copies of the data object stored across the different storage arrays in storage-group2, as well as an indication of the number of locally and remotely stored data objects. In the example shown, the legend 310 indicates that six copies are stored on VMAX storage arrays, no copies are stored on XtremIO storage arrays, and one copy is stored on Data Domain storage arrays. The legend further indicates that 2 copies of the data object are stored locally and 4 copies are stored remotely.

While the legend 310 shown in this example provides explanations to specific symbols related to storage-group2, one of ordinary skill in the art will appreciate that additional symbols may be added as necessary. For example, additional types of storage arrays may be included and properly represented in the legend 310. Also, different colors may be used to represent different statuses of the data objects and/or connectors. Additionally, warning tags that indicate faults being present (e.g., warning indicating that a storage array is not online or that a data object that is expected to be present at one of the data arrays is not locatable), may be depicted in the legend 310 to provide a user with a concise view not only the copies of data objects within storage-group2, but also a status of each of the data objects.

A storage group details window 315 is provided for display in a second section of the fan out graphic 300. A listing of different characteristics of storage-group2 may be shown within the storage group details window 315. In the current example, the listing includes an identification of a tenant, an application used, a storage system identification number, a protection plan package level, and a most recent result of a compliance check. Shown in correspondence to the listing are the values associated to storage-group2. Specifically, the storage group details window 315 shows that EMC is the tenant and is using an unknown application. The storage system represented is a VMAX storage array with an identification of 000196700673 and the level of the protection plan package is silver. Lastly, the storage group details window 315 shows that a compliance check was performed one minute ago and came back "OK" as represented by the check mark icon. Thus, the storage group details window 315, as shown, provides the user a summarized view of the details relating to storage-group2 such that the user can easily ascertain the status of the storage group.

In some embodiments, search and sort functions 320 may be provided to the user. The search and sort functions 320 allow the user to organize the data in a manner preferred by the user. For example, in the fan out graphic 300, the first point-in-time group of data objects 330 and the second point-in-time group of data objects 335 are shown in the search and sort functions 320 as being sorted in reverse alphabetical order within the point-in-time data objects window 325. While the point-in-time groups of data objects are shown as being sorted in reverse alphabetical order, options are provided so that the point-in-time groups of data objects can be sorted in other orders (e.g., alphabetical, numerical, etc.). The search and sort functions 320 also provide the user the ability to perform a text search for a specific point-in-time data object. For example, the user my select the magnifying glass icon and type in a term to be searched. When the inputs are received, only the results matching the search term are shown in the point-in-time data objects window 325.

As indicated above, the fan out graphic 300 in this example embodiment shows the first point-in-time group of data objects 330 and the second point-in-time group of data objects 335 in the point-in-time data objects window 325. Each of the first and second point-in-time groups of data objects 330 and 335 have first and second creation dates 340 and 345. The first and second point-in-time groups of data objects 330 and 335 also include first and second groups of nodes 350 and 355 that represent the propagation of the primary data object to the one or more secondary data objects, as will be described in more detail with reference to FIG. 4 below. Lastly, the first and second point-in-time groups of data objects 330 and 335 include respective first and second indications of number of copies 360 and 365. The first and second indications of number of copies 360 and 365 shows a number that represents the number of copies of a data object that exists in the first and second point-in-time groups of data objects 330 and 335.

In the example provided, the first point-in-time group of data objects 330 has a first creation date 340 of "Sun, May 1, 10:28 PM." The first creation date 340 corresponds to the earliest creation date of all the data objects in the first point-in-time group of data objects 330. For example, the first group of nodes 350 includes six nodes where each node represents a copy of the data object. One of the six nodes will have the earliest creation date of "Sun, May 1, 10:28 PM," and thus will be identified as the primary data object off of which all the secondary data objects are copied. In this example of the first point-in-time group of data objects 330, the primary data object 370 is shown as the leftmost node in the first group of nodes 350. Each of the other nodes of the first group of nodes 350 is thus a secondary data object, i.e., a copy of the primary data object. Each of the secondary objects may be stored on a different file store. Also, as discussed above, secondary data objects connected by solid lines are stored locally, while ones connected by dashed lines are stored remotely. In this example, two copies are stored on a remote storage array. Lastly, every single storage array in the first point-in-time group of data objects 330 is a VMAX storage array, as represented by the "V" inscribed in each circular node, and the first indication of number of copies 360 suggests that six copies of the data object exists.

Also shown in the example provided is a second point-in-time group of data objects 335 having a second creation date 345 of "Tues, May 3, 8:31 AM." The second creation date 340 corresponds to the earliest creation date of all the data objects in the second point-in-time group of data objects 335. For example, the second group of nodes 355 includes two nodes where each node represents a copy of the data object. One of the two nodes will have the earliest creation date of "Tues, May 3, 8:31 AM," and thus will represent the primary data object off of which the secondary data object is copied. In this example of the second point-in-time group of data objects 335, the primary data object 375 is shown as the leftmost node in the second group of nodes 355. The other node of the second group of nodes 355 is thus a secondary data object, i.e., a copy of the primary data object. The secondary object may be stored on a file store different from the first file store. Since the secondary data object in this case is connected by a dashed line, the secondary data object is shown to be stored remotely. The second point-in-time group of data objects 335 further shows that the secondary data object is stored on a Data Domain storage array. Lastly, the second indication of number of copies 365 suggests that two copies of the data object exist.

FIGS. 4a and 4b provide examples of drill in views of first and second point-in-time groups of data objects 330 and 335. For example, FIG. 4a provides a first drill in view 405 of the first group of nodes 350. As discussed above, the primary data object 370 is shown as the leftmost node in the first group of nodes 350. Each of the remaining nodes of the first group of nodes 350 is a secondary data object 410a-410e (i.e., a copy of the primary data object) that may be stored on a different file store. Secondary data objects connected by solid lines (i.e., 410a, 410c and 410f) are stored locally, and secondary objects connected by dashed lines (i.e., 410b and 410e) are stored remotely. A first list of nodes 415 provides additional details related to the first group of nodes 350. For example, the first line 420 of the first list of nodes 415 represents the primary data object 370 of the first group of nodes 350.

The first line 420 indicates that the primary data object 370 was created on "Sun, May 01, 10:28:00 2016," and is stored on a VMAX storage array with an identification of 000196700673. The second line 425 of the first list of nodes 415 indicates that a secondary data object created on "Sun, May 01, 12:00:00 2016" is stored on a VMAX storage array with an identification of 000196700674. The third line 430 of the first list of nodes 415 indicates that another secondary data object created on "Sun, May 01, 1:00:00 2016," is stored on a VMAX storage array with an identification of 000196700674. The third line 430 further indicates that this particular secondary data object is stored at a remote VMAX storage array. The fourth line 435 of the first list of nodes 415 indicates that yet another secondary data object created on "Sun, May 01, 2:00:00 2016," is stored on a VMAX storage array with an identification of 000196700554. The fourth line 435 indicates that this particular secondary data object is also stored at a remote VMAX storage array.

The right section of each of the first, second, third and fourth lines 420-435 of the first list of nodes 415 provides a numerical indicator of the size of each storage array as well as a bar graph indicator indicating the percentage of the system that has been used. In this example, each of the VMAX storage arrays has 40 GB of capacity, and the bar graph indicator in the second, third and fourth lines 425-435 indicate various amounts of system usage. The presentation of the numerical indicator as well as the bar graph provides the user with a simple manner in which to determine how much capacity remains on the storage array. Such information may help the user to determine what types of backup approaches should be taken in order to provide the most security while utilizing resources efficiently.

Similar to FIG. 4a, FIG. 4b provides a second drill in view 440 of the second group of nodes 355. As discussed above, the primary data object 375 is shown as the leftmost node in the second group of nodes 355. The other nodes of the second group of nodes 355 is a secondary data object 445 (i.e., a copy of the primary data object) that may be stored on a different file store. In this example, the secondary data object 445 is stored on a Data Domain storage array. The secondary data object 445 is connected by a dashed line, thereby indicating that the secondary object 445 is stored remotely. A second list of nodes 450 provides additional details related to the second group of nodes 355. For example, the first line 455 of the second list of nodes 450 represents the primary data object 375 of the second group of nodes 355. The first line 455 of the second list of nodes 450 shows that the primary data object 375 was created on "Sun, May 01, 10:28:00 2016," and is stored on a VMAX storage array with an identification of 000196700674. The second line 460 of the second list of nodes 450 indicates that the secondary data object 445 created on "Tue, May 03, 8:31:00 2016," is stored on a Data Domain storage array with an identification DD_remote_sg1. As the identification suggests, and as indicated by the dashed line connector between primary data object 375 and secondary data object 445, the secondary data object is stored on a remote storage array.

The right section of each of the first and second lines 455-460 of the second list of nodes 450 provides a numerical indicator of the size of each storage array as well as a bar graph indicator indicating the percentage of the system that has been used. In this example, the right section of the second line 460 provides an indication that the VMAX storage array on which the primary data object 375 is stored has 40 GB of capacity, while the bar graph shows approximately 50% system usage. The second line 460 of the second list of nodes 450 shows that the Data Domain storage array on which the secondary data object 445 is stored has a capacity of 20 GB with approximately 65% of system usage. The right section of the and second line 460 of the second list of nodes 450 also provides an indication that the secondary data object 445 has been exported. This indication is provided by the tag 465. The number "1" located inside the tag indicates that the secondary data object 445 has been exported once. Furthermore, the right section of the second line 460 provides the additional detail that the secondary data object 445 was exported to host "test_dev."

In some embodiments, the data objects stored as copies across the different storage arrays are snapshots, which are captures of states of computer system objects at a specific moment in time. These snapshots can be first stored to a primary file store such as a VMAX storage array, and then replicated and stored across other storage arrays such as XtremIO, Data Domain, or a variety of other cloud based storage arrays. For example, a primary data object may originate on a VMAX storage array, with subsequent copies being made and stored on an XtremIO storage array and a Data Domain storage array. In this instance, three copies (including the primary data object) are produced and stored individually.

In some embodiments, the visualization, as shown in FIGS. 4a and 4b, provides a simple, concise and intuitive view of how the data objects are stored across the different storage arrays. For example, when a user looks at a graphic like the one shown in FIG. 4a, the user can immediately identify that there are a total of six copies of the data object stored. Further inspection shows that four copies are stored locally and two are store remotely. FIG. 4a also clearly shows that all copies of the data object are stored on a VMAX storage arrays. Additionally, in the non drill in view shown in FIG. 3, a user can immediately identify when a compliance check was previously performed, and the result of that compliance check. In other words, the user can recognize from a glance not only what backup copies are included in storage-group2, but the status of those copies.

While the examples provided above show that the primary data objects are stored on the more reliable VMAX storage array, one of ordinary skill in the art can appreciate that the primary data object may be stored in any of the variety of storage arrays, including but not limited to the XtremIO and Data Domain storage arrays. From there, copies can be made of the primary data object and be propagated across the other storage arrays, including one or more VMAX storage arrays. Thus, there is no limitation as to where the primary data object originates, as the fan out visualization is capable of depicting examples where the primary data object is stored in secondary file stores that may be remote from the primary file store. Furthermore, the fan out visualization may be built on a common user interface such that it may integrate storage arrays and corresponding applications that may originate from different vendors.

In some embodiments, a back end processor processes information related to the data objects to identify where all copies of the data object resides. Compliance checks may also be run based on the processing of this information. For example, if the back end processor determines that a certain number of copies of the data object are expected to be shown, but fewer copies than expected are found across the different storage arrays, a notification may be provided to the user as a graphical output. For example, in FIG. 3, the results of a compliance check are shown in storage group details window 315. In the event that a copy of the data object is determined to be missing, the compliance check may provide a red flag and some text indicating what triggered the fault (e.g., missing copy of the data object). The compliance check will only return a check mark icon as shown in FIG. 3 if all copies that are expected to exist are determined to exist on one of the storage arrays. Likewise, the compliance check may also raise a red flag if a copy appears in a different or unexpected location.

In some embodiments, the fan out visualization may be manipulated so as to remove copies that a user determines to be unnecessary. For example, if upon viewing the fan out visualization the user determines that there are superfluous copies stored on one or more of the secondary file stores, the user may perform an action directly on the fan out visualization to remove such a copy. For example, the user may highlight the node which the user wishes to delete, and enter a command to delete the node representing the copy of the data object that the user wishes to delete. The information related to that particular fan out visualization is updated based on the user interaction so that subsequent compliance checks do not return faults as a result of intentional removal of copies of data objects.

Since the fan out visualization deals with copies of a snapshot, each point-in-time snapshot captured at a unique time will require a separate fan out visualization. In other words, each fan out visualization represents a specific moment in time. Thus, each different moment in time must be represented by a new fan out visualization. In some embodiments, a user may request to view fan out visualizations of related data objects across a specified timeframe. That is, a user may request to see all point-in-time snapshots related to a data object.

The number of copies of data objects that are stored across the different storage arrays is typically related to the data protection plan that a user subscribes to. For example, to enhance the security of a protection plan, additional copies may be made and stored on additional storage arrays. This redundancy reduces the chance that all copies are corrupted. However, such redundancy is less cost efficient as it not only requires more storage space, but also more processing power to maintain the redundancy. Thus, regardless of the protection plan chosen, a user may set a limit to the number of copies that are made of the primary data object. In some embodiments, if a primary data object is lost or corrupted, a secondary copy of the data object may be rolled back in place of the primary data object to create a new point-in-time copy.

Figure 5:
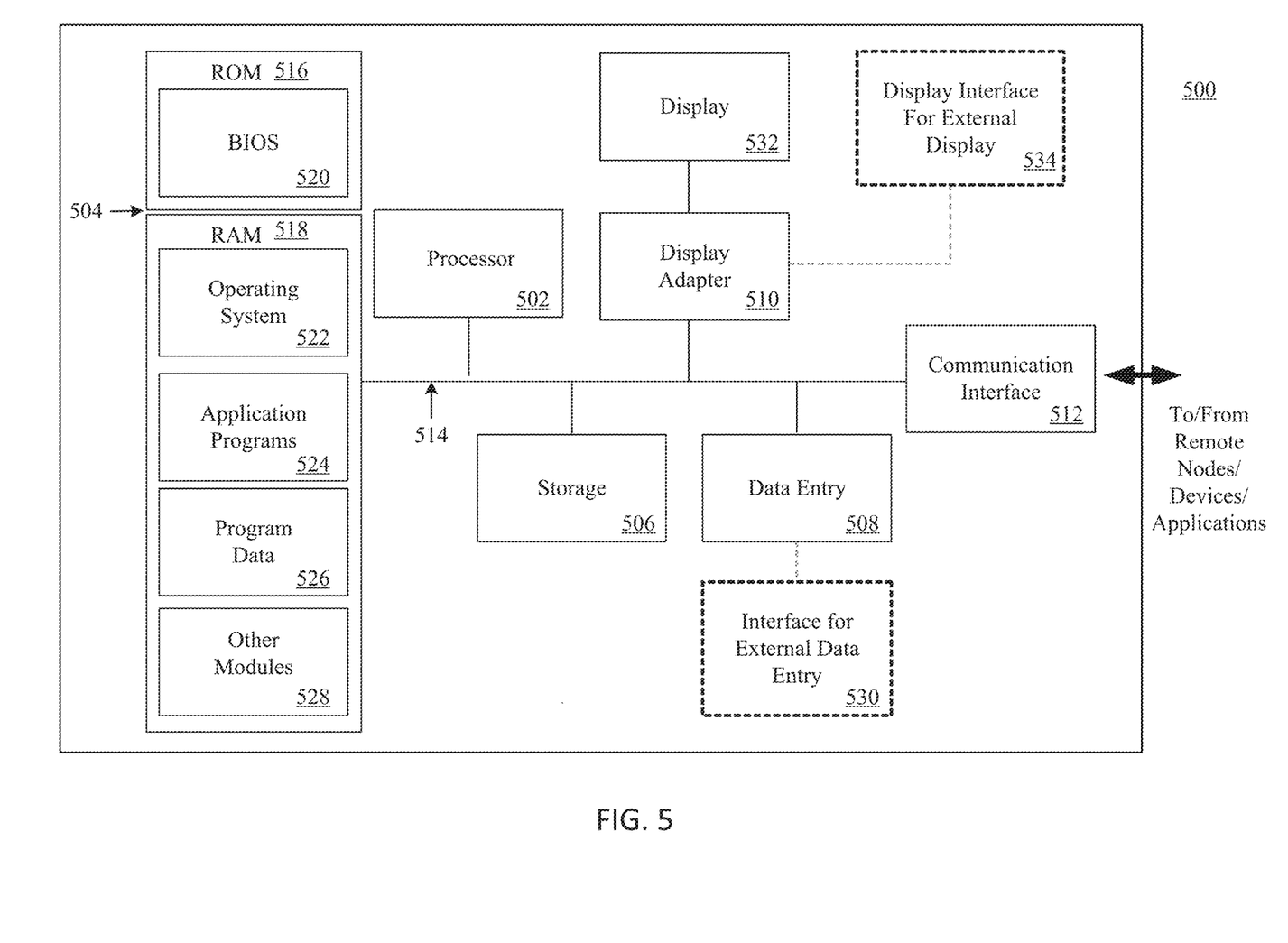
FIG. 5 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 5 may vary depending on the system implementation. With reference to FIG. 5, an exemplary system for implementing the subject matter disclosed herein includes a hardware device 500, including a processing unit 502, memory 504, storage 506, a data entry module 508, a display adapter 510, a communication interface 512, and a bus 514 that couples the elements 504-512 to the processing unit 502.

The bus 514 may comprise any type of bus architecture. Examples include a memory bus, a peripheral bus, a local bus, etc. The processing unit 502 is an instruction execution machine, apparatus, or device and may comprise a microprocessor, a digital signal processor, a graphics processing unit, an application specific integrated circuit (ASIC), a field programmable gate array (FPGA), etc. The processing unit 502 may be configured to execute program instructions stored in the memory 504 and/or the storage 506 and/or received via the data entry module 508.

The memory 504 may include read only memory (ROM) 516 and random access memory (RAM) 518. The memory 504 may be configured to store program instructions and data during operation of the hardware device 500. In various embodiments, the memory 504 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 504 may also include nonvolatile memory technologies such as nonvolatile flash RAM (NVRAM) or ROM. In some embodiments, it is contemplated that the memory 504 may include a combination of technologies such as the foregoing, as well as other technologies not specifically mentioned. When the subject matter is implemented in a computer system, a basic input/output system (BIOS) 520, containing the basic routines that help to transfer information between elements within the computer system, such as during start-up, is stored in the ROM 516.

The storage 506 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 500.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 506, the ROM 516 or the RAM 518, including an operating system 522, one or more applications programs 524, program data 526, and other program modules 528. A user may enter commands and information into the hardware device 500 through the data entry module 508. The data entry module 508 may include mechanisms such as a keyboard, a touch screen, a pointing device, etc. Other external input devices (not shown) are connected to the hardware device 500 via an external data entry interface 530.

By way of example and not limitation, external input devices may include a microphone, joystick, game pad, satellite dish, scanner, or the like. In some embodiments, external input devices may include video or audio input devices such as a video camera, a still camera, etc. The data entry module 508 may be configured to receive input from one or more users of the hardware device 500 and to deliver such input to the processing unit 502 and/or the memory 504 via the bus 514.

A display 532 is also connected to the bus 514 via the display adapter 510. The display 532 may be configured to display output of the hardware device 500 to one or more users. In some embodiments, a given device such as a touch screen, for example, may function as both the data entry module 508 and the display 532. External display devices may also be connected to the bus 514 via an external display interface 534. Other peripheral output devices, not shown, such as speakers and printers, may be connected to the hardware device 500.

The hardware device 500 may operate in a networked environment using logical connections to one or more remote nodes (not shown) via the communication interface 512. The remote node may be another computer, a server, a router, a peer device or other common network node, and typically includes many or all of the elements described above relative to the hardware device 500. The communication interface 512 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 512 may include logic configured to support direct memory access (DMA) transfers between the memory 504 and other devices.

In a networked environment, program modules depicted relative to the hardware device 500, or portions thereof, may be stored in a remote storage device, such as, for example, on a server. It will be appreciated that other hardware and/or software to establish a communications link between the hardware device 500 and other devices may be used.

It should be understood that the arrangement of the hardware device 500 illustrated in FIG. 5 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 500.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 5.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for providing a graphical representation of copies of a data object stored across a plurality of storage arrays, the system comprising:

a computer system, the computer system having one or more processors and a non-transitory computer-readable medium storing a processor-based application comprising a plurality of instructions, which when executed cause the one or more processors to:

identify a primary data object stored in a first file store, the first file store comprising a first storage array at a first location;

identify one or more secondary data objects stored on one or more secondary file stores at different locations, each secondary data object comprising a copy of the primary data object, wherein a respective secondary file store comprises a second storage array at a second location, the second storage array being a different storage array type than the first storage array; and provide, for display on a user interface, a graphic including (1) a first node representing the primary data object, (2) at least one or more second nodes each representing the one or more secondary data objects (3) one or more relationships between the first node and the one or more second nodes representing respective relationships between the first location of the primary data object and the different locations of the secondary data objects and (4) a pre-defined visual appearance based on storage array type, wherein a visual appearance for a second node representing a second object stored on the second storage array is different than a visual appearance of the first node.

2. The system of claim 1, wherein the plurality of nodes is connected by lines to represent the relationship between the primary data object and each of the one or more secondary data objects.

3. The system of claim 2, wherein the lines connecting the plurality of nodes is one of a solid line and a dashed line, wherein a node connected by a solid line represents a locally stored data object, and wherein a node connected by a dashed line represents remotely stored data object.

4. The system of claim 1, wherein each of the plurality of nodes includes a label indicating a type of storage array on which a data object corresponding to the node is stored.

5. The system of claim 1, wherein the graphic provided for display on the user interface further provides information about a compliance check on the primary data object and the one or more secondary data objects.

6. The system of claim 1, further comprising instructions, which when executed cause the one or more processors to:

receive a user input to remove one of the one or more secondary data objects based on the graphic provided for display on the user interface; and remove the one secondary data object from a corresponding secondary file store.

7. A computer-implemented method for providing a graphical representation of copies of a data object stored across a plurality of storage arrays, the method comprising:

identifying a primary data object stored in a first file store, the first file store comprising a first storage array at a first location;

identifying one or more secondary data objects stored on one or more secondary file stores at different locations, each secondary data object comprising a copy of the primary data object, wherein a respective secondary file store comprises a second storage array at a second location, the second storage array being a different storage array type than the first storage array; and providing, for display on a user interface, a graphic including (1) a first node representing the primary data object, (2) at least one or more second nodes each representing the one or more secondary data objects (3) one or more relationships between the first node and the one or more second nodes representing respective relationships between the first location of the primary data object and the different locations of the secondary data objects and (4) a pre-defined visual appearance based on storage array type, wherein a visual appearance for a second node representing a second object stored on the second storage array is different than a visual appearance of the first node.

8. The method of claim 7, wherein the plurality of nodes is connected by lines to represent the relationship between the primary data object and each of the one or more secondary data objects.

9. The method of claim 8, wherein the lines connecting the plurality of nodes is one of a solid line and a dashed line, wherein a node connected by a solid line represents a locally stored data object, and wherein a node connected by a dashed line represents remotely stored data object.

10. The method of claim 7, wherein each of the plurality of nodes includes a label indicating a type of storage array on which a data object corresponding to the node is stored.

11. The method of claim 7, wherein the graphic provided for display on the user interface further provides information about a compliance check on the primary data object and the one or more secondary data objects.

12. The method of claim 7, further comprising:
receiving a user input to remove one of the one or more secondary data objects based on the graphic provided for display on the user interface; and
removing the one secondary data object from a corresponding secondary file store.

13. A computer program product, comprising a non-transitory computer-readable medium having a computer-readable program code embodied therein to be executed by one or more processors, the program code including instructions to:

identify a primary data object stored in a first file store, the first file store comprising a first storage array at a first location;

identify one or more secondary data objects stored on one or more secondary file stores at different locations, each secondary data object comprising a copy of the primary data object, wherein a respective secondary file store comprises a second storage array at a second location, the second storage array being a different storage array type than the first storage array; and provide, for display on a user interface, a graphic including (1) a first node representing the primary data object, (2) at least one or more second nodes each representing the one or more secondary data objects (3) one or more relationships between the first node and the one or more second nodes representing respective relationships between the first location of the primary data object and the different locations of the secondary data objects and (4) a pre-defined visual appearance based on storage array type, wherein a visual appearance for a second node representing a second object stored on the second storage array is different than a visual appearance of the first node.

14. The computer program product of claim 13, wherein the plurality of nodes are connected by lines to represent the relationship between the primary data object and each of the one or more secondary data objects.

15. The computer program product of claim 14, wherein the lines connecting the plurality of nodes is one of a solid line and a dashed line, wherein a node connected by a solid line represents a locally stored data object, and wherein a node connected by a dashed line represents remotely stored data object.

16. The computer program product of claim 13, wherein each of the plurality of nodes includes a label indicating a type of storage array on which a data object corresponding to the node is stored.

17. The computer program product of claim 13, wherein the graphic provided for display on the user interface further provides information about a compliance check on the primary data object and the one or more secondary data objects.

* * * * *